United States Patent
Stroh

(10) Patent No.: US 6,976,471 B2
(45) Date of Patent: Dec. 20, 2005

(54) TORQUE CONTROL SYSTEM

(75) Inventor: David J. Stroh, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/664,326

(22) Filed: Sep. 17, 2003

(65) Prior Publication Data

US 2005/0056250 A1     Mar. 17, 2005

(51) Int. Cl.⁷ ............... F02D 9/00; F02D 4/18

(52) U.S. Cl. .................. 123/399; 123/683

(58) Field of Search ............... 123/399, 673, 123/674, 677, 678, 683

(56) References Cited

U.S. PATENT DOCUMENTS

| | | | | |
|---|---|---|---|---|
| 4,549,517 A | * | 10/1985 | Kamiyama | 123/399 |
| 4,763,264 A | * | 8/1988 | Okuno et al. | 123/674 |
| 5,080,064 A | * | 1/1992 | Buslepp et al. | 123/399 |
| 5,349,932 A | * | 9/1994 | Boverie et al. | 123/399 |
| 5,606,951 A | * | 3/1997 | Southern et al. | 123/399 |
| 6,250,292 B1 | * | 6/2001 | Suhre | 123/399 |
| 6,584,392 B1 | * | 6/2003 | Jankovic et al. | 123/399 |
| 6,701,890 B1 | * | 3/2004 | Suhre et al. | 123/399 |
| 6,761,146 B1 | * | 7/2004 | Livshiz et al. | 123/399 |

* cited by examiner

Primary Examiner—Erick Solis
(74) Attorney, Agent, or Firm—Christopher DeVries

(57) ABSTRACT

A method of controlling torque output of an engine includes calculating a desired air-per-cylinder (APC) based on a torque command and determining an effective throttle area corresponding to the desired APC based on a non-dimensionalized model. A throttle is regulated based on the effective throttle area.

19 Claims, 3 Drawing Sheets

TORQUE CONTROL SYSTEM

FIELD OF THE INVENTION

The present invention relates to torque control systems for engines, and more particularly to torque control systems that adjust cylinder airflow.

BACKGROUND OF THE INVENTION

Internal combustion engine control systems are typically steady-state, throttle-based control systems. In a steady-state control system, the torque output of the engine is related to a throttle set point. A driver adjusts a position of an accelerator pedal, which changes the throttle set point. The throttle set point controls the amount of airflow into an intake manifold and cylinders. In other words, the torque output of the engine is related to cylinder airflow, which is based on the throttle set point. After a throttle adjustment, the engine torque eventually settles at a desired value that is related to the cylinder airflow.

Steady-state, engine torque control systems typically determine the throttle set point based on intermediate parameters such as mass air flow rates and manifold absolute pressure. The use of these parameters requires additional computation. Determining the throttle set point based on intermediate parameters also involves numerous diagnostic requirements. As a result, these systems are overly complex.

SUMMARY OF THE INVENTION

Accordingly, the present invention provides a method of controlling torque output of an engine. The method includes calculating a desired air-per-cylinder (APC) based on a torque command and determining an effective throttle area corresponding to the desired APC based on a non-dimensionalized model. A throttle is regulated based on the effective throttle area.

In one feature, determining the effective throttle area includes establishing an effective throttle area look-up table based on the non-dimensionalized model.

In another feature, the effective throttle area is based on the desired APC, an engine speed, an ambient temperature and an ambient pressure.

In still another feature, the method further includes measuring an actual APC and adjusting said effective throttle area based on said actual APC. The step of adjusting the effective throttle area further includes calculating an APC error based on a difference between the desired APC and the actual APC.

In yet another feature, the method further includes determining a throttle area correction based on the APC error and summing the effective throttle area and the throttle area adjustment.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
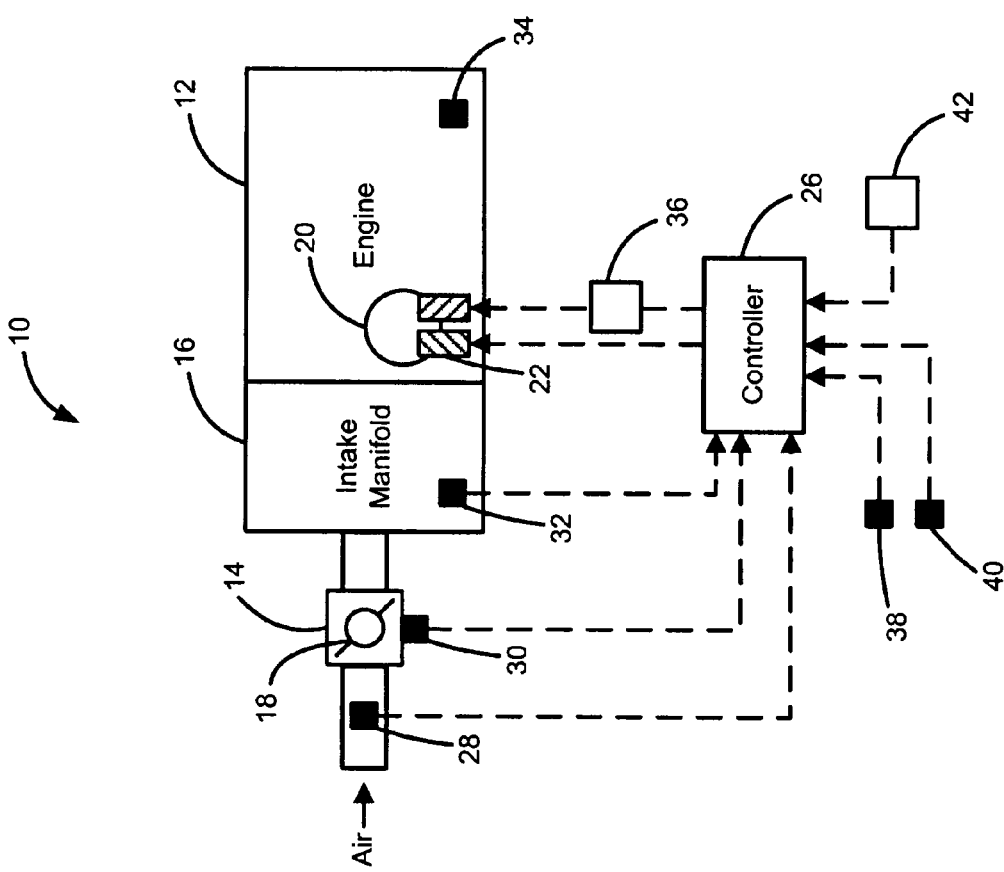
FIG. 1 is a functional block diagram illustrating an engine control system according to the present invention.

The following description of the preferred embodiment is merely exemplary in nature and is in no way intended to limit the invention, its application, or uses. For purposes of clarity, the same reference numbers will be used in the drawings to identify similar elements.

Referring now to FIG. 1, a vehicle system 10 includes an engine 12. The engine 12 includes a throttle 14 and an intake manifold 16. Air flow through the throttle 14 and into the intake manifold 16 is based on a position of a throttle plate 18. Air flows into individual cylinders 20 of the engine 12. Although only a single cylinder 20 is shown, it is appreciated that the engine 12 can include multiple cylinders 20. The cylinder 20 includes a piston (not shown) that compresses an air/fuel mixture. More specifically, air flow into the cylinder 20 is mixed with fuel injected by a fuel injector 22. A spark plug 24 ignites the compressed air/fuel mixture in a combustion process to produce engine torque.

A controller 26 controls engine torque based on the torque control of the present invention. The controller 26 adjusts the engine torque based on a requested or reference torque. The controller 26 controls a rate of torque change delivered by the engine 12 by determining an amount of air-per-cylinder (APC) for the cylinders 20 that is necessary to deliver the requested engine torque. APC is determined based on the torque command. More specifically, APC is determined from a look-up table.

The controller 26 communicates with a mass air flow (MAF) sensor 28, a throttle position sensor (TPS) 30, a manifold absolute pressure (MAP) sensor 32 and an engine speed sensor 34. The MAF sensor 28 generates a signal indicating the amount of air flow through the throttle 14. The TPS 30 generates a signal indicating the position of the throttle plate 18 and the MAP sensor 32 generates a signal indicating the pressure within the intake manifold 16. The engine speed sensor 34 generates a signal indicating the engine speed (RPM). The controller 26 also communicates with the fuel injector 22 to control the fuel rate provided to the cylinder 20 and an ignition system 36 to control timing of the ignition spark. Ambient pressure and temperature signals are generated by ambient pressure and temperature sensors 38, 40, respectively.

The controller 26 includes a processor and memory. The memory includes an electronic data storage flash memory, erasable programmable read-only memory (EPROM), electrically erasable programmable read-only memory (EEPROM), read only memory (ROM), flash memory or a one time programmable (OTP) memory. The controller 26 executes the torque control of the present invention. More specifically, the controller 26 receives torque commands, monitors operating parameters of the engine 12, utilizes the non-dimensionalized throttle area model, solves equations and controls the throttle plate 18. The operating parameters of the engine 12 include air/fuel ratio, engine speed, actual APC, ambient temperature, ambient pressure, delivered torque, spark timing, throttle position or any other parameter.

The controller 26 receives a requested torque command ($T_{COM}$) from a driver input device 42 such as an accelerator pedal, a hand operated throttle control or a computer-based input device. $T_{COM}$ indicates a desired torque output or a desired torque change. The controller 26 determines the APC required based on $T_{COM}$. The controller 26 adjusts the throttle 14 to provide the required APC to the cylinder 20.

The APC is an intermediate parameter rather than an actuating parameter. For example, actuating parameters include the throttle position, fuel rate and ignition timing. A transfer function is developed between the APC and one or more actuating parameters. Actuating parameters are operational parameters of the engine 12 that can be directly commanded. For example, spark advance, throttle position and fuel rate are directly commanded by the controller 26. A transfer function is developed between the APC and the throttle position.

The transfer function is based on a direct mathematical relationship between the throttle area ($A_{THROTTLE}$) and the APC and is developed using quasi-steady-state testing. $A_{THROTTLE}$ is defined as the area of an opening between the throttle plate 18 and the intake manifold 16 and is based on the angular position of the throttle plate 18. The quasi-steady-state tests are run through a full range of engine speed operating points to provide data relating to a unique relationship between the APC, throttle area and engine speed. This relationship provides a model given by:

$$APC = f(A_{THROTTLE}, \text{Engine Speed}) \quad (1)$$

Changes in altitude, ambient pressure $P_{amb}$, and ambient temperature $T_{amb}$ will influence the model. For example, a rise in altitude causes $P_{amb}$ and air density to decrease. Additionally, an increase in $T_{amb}$ causes a decrease in air density. $T_{amb}$ and $P_{amb}$ are constantly changing during operation of the engine 12 and are directly measured by the pressure and temperature sensors 38 and 40. The changes in $T_{amb}$ and $P_{amb}$ influence the model. Therefore, all parameters are non-dimensionalized using Buckingham Pi analysis. This results in a non-dimensionalized model that is valid at any ambient condition. The Buckingham Pi analysis produces the following three non-dimensionalized terms, or Pi groups:

$$(APC \cdot R \cdot T_{amb})/(P_{amb} \cdot V);$$

$$A_{THROTTLE}/(V^{2/3}); \text{ and}$$

$$(\text{Engine Speed} \cdot V^{1/3})/(R \cdot T_{amb})^{1/2};$$

where:
 R = the universal gas constant for air; and
 V = the cylinder volume.

R is always constant and V is constant for a given engine. The three non-dimensionalized terms are simplified by removing the constant terms R and V. The simplified terms are then placed into the model given at (1) to yield the following non-dimensionalized model:

$$(APC \cdot T_{amb})/(P_{amb}) = f(A_{THROTTLE}, \text{Engine Speed}/(T_{amb})^{1/2}) \quad (2)$$

This non-dimensionalized model is inverted to provide a non-dimensionalized model for $A_{THROTTLE}$ based on non-dimensionalized APC and non-dimensionalized engine speed. The inverted non-dimensionalized model is implemented by the control system 10 and is expressed as:

$$A_{THROTTLE} = f((APC \cdot T_{amb})/P_{amb}), \text{Engine Speed}/(T_{amb})^{1/2}) \quad (3)$$

Figure 2:
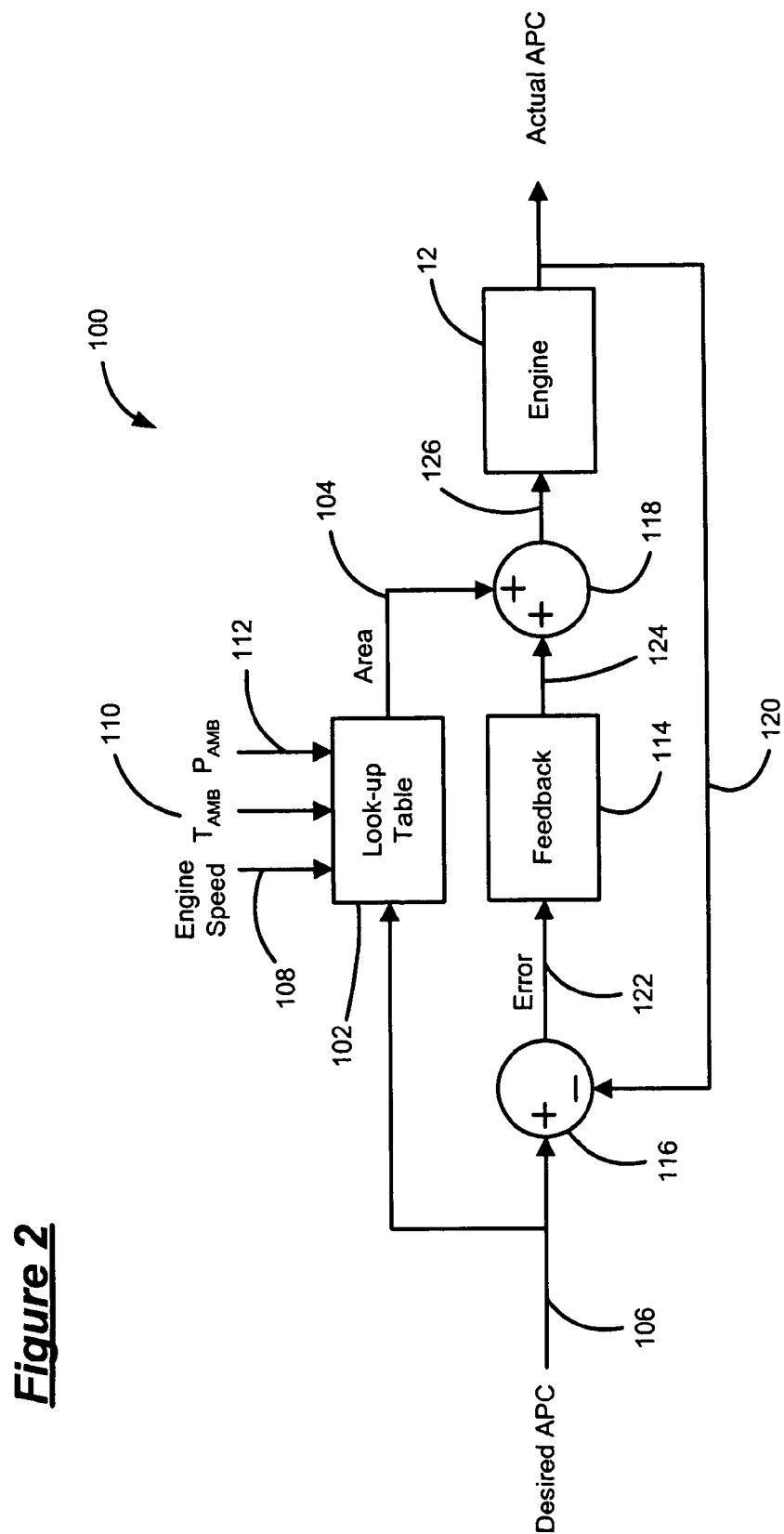
FIG. 2 is a signal flow diagram illustrating a control process executed by a controller of the engine control system shown in FIG. 1.

FIG. 2 is a block diagram illustrating a signal flow 100 of the control process executed by the controller 26. The control process includes the non-dimensionalized model given at (3) and a feedback loop. The inverted non-dimensionalized model is utilized to construct a look-up table 102. The look-up table 102 determines a desired $A_{THROTTLE}$ command 104 based on a desired APC command 106. The desired APC command 106 correlates to $T_{COM}$ from the driver input device 42. An engine speed signal 108, a $T_{amb}$ signal 110, and a $P_{amb}$ signal 112 are input to the look-up table 102. The $A_{THROTTLE}$ needed to provide the desired APC is determined based on the input signals. The engine speed signal 108 is received from the engine speed sensor 34. The $T_{amb}$ signal 110 is received from the temperature sensor 40 and the $P_{amb}$ signal 112 is received from the pressure sensor 38.

The inverted non-dimensionalized model includes inherent errors due to changing aspects of the engine 12 as the engine 12 ages. For example, debris or carbon can form on the throttle plate 18. Additionally, exhaust gas recirculation (ECR) can cause errors in the actual APC. To account for this, the control process includes a feedback 114, a first summing junction 116 and a second summing junction 118. The feedback 114 adjusts the desired $A_{THROTTLE}$ command 104 to compensate for any error. During operation of the engine 12, an actual APC signal 120 from the MAF sensor 28 is input to the first summing junction 116. The first summing junction 116 compares the actual APC to the desired APC indicated by the desired APC command 106. An error signal 122 indicating the difference between the desired APC and the actual APC is input to the feedback 114.

The feedback 114 outputs an $A_{THROTTLE}$ correction signal 124 that indicates an amount of $A_{THROTTLE}$ adjustment needed for the actual APC to provide $T_{COM}$. The $A_{THROTTLE}$ correction signal 124 is added to the desired $A_{THROTTLE}$ command 104 at the second summing junction 118. The second summing junction 118 outputs an effective $A_{THROTTLE}$ command 126 that controls the position of the throttle plate 18. Adjusting the position of the throttle plate 18 in accordance with the effective $A_{THROTTLE}$ command 126, changes the air mass flow rate into the intake manifold 16 so that the actual APC delivers $T_{COM}$ from the engine 12.

Figure 3:
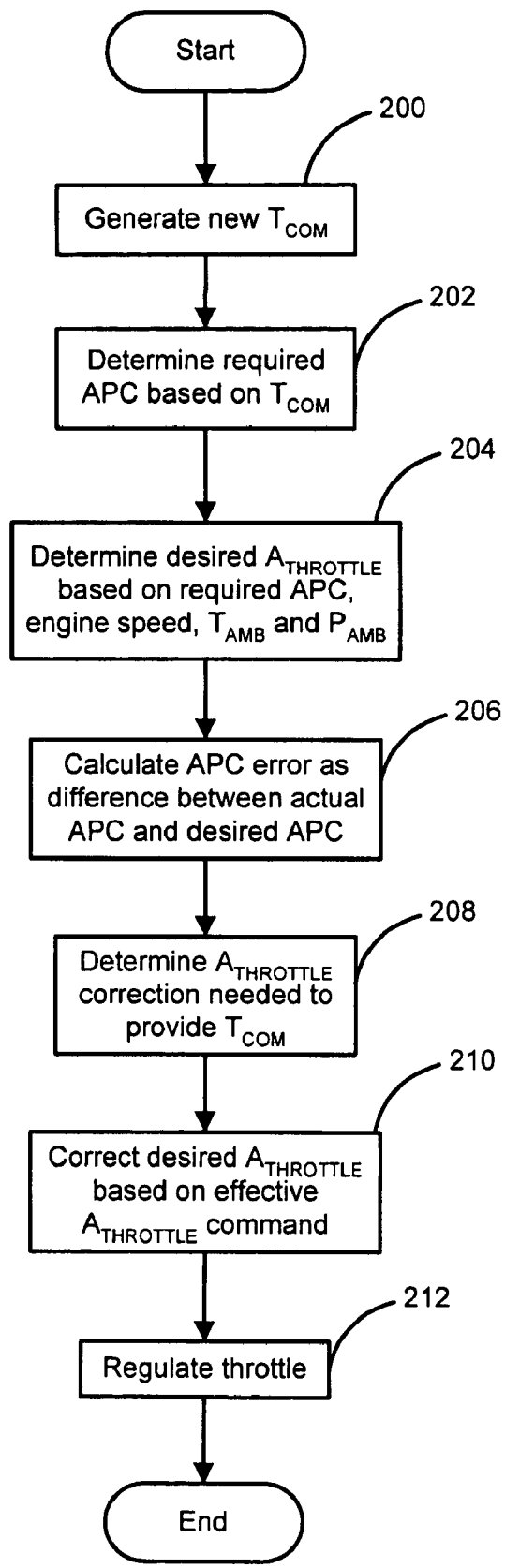
FIG. 3 is a flow chart illustrating a torque control according to the principles of the present invention.

FIG. 3 is a flow chart illustrating the torque control of the present invention. Initially, in step 200, a new $T_{COM}$ is been generated from the driver input device 42. $T_{COM}$ indicates the desired torque output. In step 202, control determines the desired APC needed to deliver the requested torque based on $T_{COM}$. In step 204, control determines the desired $A_{THROTTLE}$ based on engine speed, $T_{amb}$ and $P_{amb}$ according to the inverted non-dimensionalized model. More specifically, control uses the look-up table that was constructed based on the non-dimensionalized model to determine the desired $A_{THROTTLE}$.

In step 206, control monitors the actual APC and calculates the error based on the difference between the desired APC and the actual APC. In step 208, control executes the feedback algorithm to determine the $A_{THROTTLE}$ correction based on the calculated error. The actual APC required to deliver the requested torque is based on the $A_{THROTTLE}$ correction. In step 210, the desired $A_{THROTTLE}$ command is corrected in accordance with the $A_{THROTTLE}$ correction to provide the effective $A_{THROTTLE}$ command. In step 212, the throttle plate 18 is adjusted based on the effective $A_{THROTTLE}$ command. Thus, the actual APC is adjusted to deliver $T_{COM}$.

$T_{COM}$ continuously changes during operation of the engine 12. The controller 26 continuously commands the throttle 14 to adjust the angular position of the throttle plate 18 based on $T_{COM}$. Thus, the torque control system and method of the present invention, as described above, actively controls the torque output of the engine 12. Dynamic torque response is improved since APC is directly mapped to the steady-state $A_{THROTTLE}$. Intermediate parameters such as mass flow and manifold pressure are eliminated, reducing diagnostic requirements. Further, the simplified, non-dimensionalized model reduces computation demands on the controller 26.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of controlling torque output of an engine, comprising:
    calculating a desired air-per-cylinder (APC) based on a torque command;
    determining an effective throttle area corresponding to said desired APC independent of a mass air flow and a manifold absolute pressure and based on a non-dimensionalized model; and
    regulating a throttle based on said effective throttle area.

2. The method of claim 1 wherein said step of determining said effective throttle area includes establishing an effective throttle area look-up table based on said non-dimensionalized model.

3. The method of claim 1 wherein said effective throttle area is based on said desired APC, an engine speed, an ambient temperature and an ambient pressure.

4. The method of claim 1 further comprising:
    measuring an actual APC; and
    adjusting said effective throttle area based on said actual APC.

5. The method of claim 4 wherein said step of adjusting said effective throttle area further includes calculating an APC error based on a difference between said desired APC and said actual APC.

6. The method of claim 5 further comprising:
    determining a throttle area correction based on said APC error; and
    summing said effective throttle area and said throttle area adjustment.

7. A system to control torque output of an engine, comprising:
    a throttle that regulates airflow into said engine; and
    a controller that calculates a desired air-per-cylinder (APC) based on a torque command, that determines an effective throttle area corresponding to said desired APC independent of a mass air flow and a manifold absolute pressure and based on a non-dimensionalized model and that regulates said throttle based on said effective throttle area.

8. The system of claim 7 wherein said controller determines said effective throttle area using an effective throttle area look-up table that is based on said non-dimensionalized model.

9. The system of claim 7 further comprising:
    an engine speed sensor that generates an engine speed signal;
    an ambient temperature sensor that generates an ambient temperature signal; and
    an ambient pressure sensor that generates an ambient pressure signal, wherein said effective throttle area is based on said desired APC, said engine speed signal, said ambient temperature signal and said ambient pressure signal.

10. The system of claim 7 further comprising a manifold air flow (MAF) sensor that measures an actual APC, wherein said controller adjusts said effective throttle area based on said actual APC.

11. The system of claim 10 wherein said controller calculates an APC error based on a difference between said desired APC and said actual ARC.

12. The method of claim 11 wherein said controller determines a throttle area correction based on said APC error and sums said effective throttle area and said throttle area adjustment.

13. A method of regulating mass airflow through a throttle to control torque output of an engine, comprising:
    generating a torque command signal;
    calculating a desired air-per-cylinder (APC) based on said torque command signal;
    determining a desired throttle area independent of a mass air flow and a manifold absolute pressure and based on a non-dimensionalized model and said desired APC;
    determining a throttle area adjustment based on an actual APC;
    calculating an effective throttle area based on said desired throttle area and said throttle area adjustment; and
    regulating said throttle to provide said effective throttle area.

14. The method of claim 13 further comprising establishing a desired throttle area look-up table based on a non-dimensionalized model.

15. The method of claim 14 further comprising determining said desired throttle area using said look-up table.

16. The method of claim 13 wherein said desired throttle area is further based on an engine speed, an ambient temperature and an ambient pressure.

17. The method of claim 13 further comprising monitoring an actual APC, wherein said throttle area adjustment is based on said actual APC.

18. The method of claim 17 wherein said throttle area adjustment is based on a difference between said actual APC and said desired APC.

19. The method of claim 13 wherein said step at calculating an effective throttle area includes summing said desired throttle area and said throttle area adjustment.

* * * * *